United States Patent [19]
Ebeling et al.

[11] 3,960,519

[45] June 1, 1976

[54] METHOD AND SYSTEM FOR GENERATING A DEHYDRATED INERT GAS STREAM

[75] Inventors: Harold O. Ebeling, Tulsa, Okla.; Robert E. McMinn, Spring, Tex.

[73] Assignee: Black, Sivalls & Bryson, Inc., Houston, Tex.

[22] Filed: Apr. 18, 1975

[21] Appl. No.: 569,274

[52] U.S. Cl. .................................. 55/31; 55/68; 55/89; 55/222; 55/269
[51] Int. Cl.² .................................. B01D 47/00
[58] Field of Search ............... 55/31, 32, 68, 30, 85, 55/89, 80, 222, 268, 269

[56] References Cited
UNITED STATES PATENTS

| | | | |
|---|---|---|---|
| 2,235,322 | 3/1941 | Martin | 55/31 |
| 3,322,411 | 5/1967 | Moore | 55/32 X |
| 3,613,333 | 10/1971 | Gardenier | 55/89 |
| 3,736,725 | 6/1973 | Alleman et al. | 55/32 |
| 3,841,382 | 10/1974 | Gravis et al. | 55/32 X |
| 3,864,103 | 2/1975 | Tuckett et al. | 55/32 |

Primary Examiner—John Adee
Attorney, Agent, or Firm—C. Clark Dougherty, Jr.

[57] ABSTRACT

The present invention relates to methods and systems for generating a dehydrated inert gas stream. By the methods of the invention a mixture of fuel and air is combusted to generate a stream of hot inert gases containing water vapor. Heat is removed from the stream of hot inert gases so that the gases are cooled and the cooled inert gases are contacted with a stream of liquid absorbent having an affinity for water vapor thereby dehydrating the stream of inert gases. The heat removed from the stream of hot inert gases is utilized to reconcentrate the stream of liquid absorbent.

24 Claims, 4 Drawing Figures

METHOD AND SYSTEM FOR GENERATING A DEHYDRATED INERT GAS STREAM

BACKGROUND OF THE INVENTION

1. Field of the Invention

The present invention relates generally to methods and systems for generating a dehydrated inert gas stream, and more particularly, but not by way of limitation, to inert gases particularly suitable for venting storage tanks and the like.

2. Description of the Prior Art

In the storage and transport of inflammable cryogenic fluids, such as liquefied natural gas, it is mandatory that storage tanks after containing such liquefied cryogenic fluids be purged with inert gas to prevent an explosive mixture of air and the inflammable fluid from occurring within the storage tank. Since liquefied cryogenic fluids must be refrigerated at very low temperatures, the inert gas used to purge the storage tanks must be dehydrated in order to prevent water from contaminating the cryogenic fluid and ice from forming on the walls of the tank. In the case of liquefied natural gas, the inert purge gas must be dehydrated to a dew point in the order of $-50°F$ at atmospheric pressure.

Heretofore it has been necessary to utilize nitrogen or other commercially available dehydrated inert gas as purge gas which is relatively expensive, and where the storage tanks to be purged are located on sea going transport vessels, storage space for transporting the purge gas in a liquid state as well as vaporizing equipment are required.

By the present invention methods and systems for generating a dehydrated inert gas stream are provided, which methods and systems are particularly suitable for installation on sea going transport vessels thereby eliminating the space and expense associated with heretofore used purge gas installations.

SUMMARY OF THE INVENTION

By the present invention a method of generating a stream of dehydrated inert gases is provided comprising the steps of combusting a fuel-air mixture to generate a stream of hot inert gases containing water vapor, removing heat from the stream of hot inert gases so that the gases are cooled, intimately contacting the cooled stream of inert gases with a stream of liquid absorbent having an affinity for water vapor thereby dehydrating the stream of inert gases, and utilizing heat removed from the stream of hot inert gases to regenerate the stream of liquid absorbent. Systems for carrying out the methods of the present invention are also provided.

It is, therefore, a general object of the present invention to provide methods and systems for generating a dehydrated stream of inert gases.

A further object of the present invention is provision of methods and systems for generating a dehydrated stream of purge gas for purging storage tanks and the like, which methods and systems are particularly suitable for shipboard utilization.

Yet a further object of the present invention is the provision of systems for generating a stream of dehydrated inert gases which are relatively simple and inexpensive to operate.

Other objects, features and advantages of the present invention will be readily apparent to those skilled in the art upon a reading of the description of preferred embodiments which follows when taken in conjunction with the accompanying drawings.

DESCRIPTION OF THE PREFERRED EMBODIMENT

Figure 1:
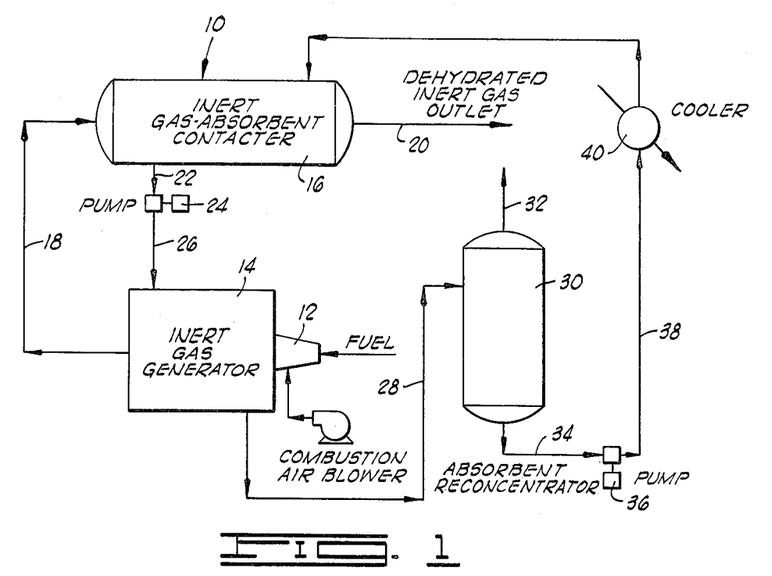
FIG. 1 is a diagrammatic illustration of a system of apparatus for carrying out the methods of the present invention.

Referring now to the drawings, and particularly to FIG. 1, a system of apparatus for carrying out the methods of the present invention is illustrated and generally designated by the numeral 10. The system 10 basically comprises one or more combustion burners for combusting a fuel-air mixture and generating a stream of hot inert combustion gases. While any of variety of conventional fuel-air burners can be utilized in accordance with this invention, burners commonly referred to as high intensity combustion burners are particularly suitable in that they bring about intimate mixing of the fuel and air and substantial complete combustion thereof with little or no flame emission therefrom. A preferred high intensity combustion burner for use in accordance with the present invention is described and claimed in U.S. Pat. No. 3,265,113 which is assigned to the assignee of the present invention. As set forth in detail in the aforementioned patent, the high intensity combustion burner includes an outer shell and a coaxial inner liner. Combustion air is injected into the space between the inner liner and the outer shell and fuel is injected into the space generally between the rearward end of the inner liner and the rearward end of the outer shell. In the use of the burner in accordance with this invention, a conventional blower or compressor is utilized to generate the combustion air at super-atmospheric pressure so that the stream of inert gases generated is also under super-atmospheric pressure. Intimate mixing of the combustion air and fuel takes place at the rearward end of the inner liner and the fuel-air mixture is combusted within the inner liner. Hot inert products of combustion are discharged from the inner liner and burner with little or no emission of flame therefrom. The fuel utilized in the burner can be either in the liquid or vapor state and conventional controls and instruments are incorporated with the burner 12 to insure that a substantially stoichiometric fuel-air mixture is produced in the burner 12 and that complete combustion of the mixture takes place.

A heat exchanger 14 is provided connected to the burner 12 in a manner such that the hot inert products or combustion produced by the burner flow through the heat exchanger 14. Like the burner 12, the heat exchanger 14 may take a variety of forms, but preferably is comprised of a housing through which the hot inert gases flow with an indirect heat exchange coil disposed therein. Inlet and outlet connections sealingly communicating with the heat exchange coil are provided in the housing, and the housing includes an inert gas stream outlet connection. As will be described further hereinbelow, a stream of liquid absorbent is caused to flow through the heat exchange coil disposed in the heat exchanger 14 so that heat is transferred from the hot inert gases flowing through the heat exchanger to the liquid absorbent, cooling the inert gases and heating the liquid absorbent.

An inert gas-liquid absorbent contactor 16 is provided having an inert gas stream inlet, an inert gas stream outlet, a liquid absorbent stream inlet and a liquid absorbent stream outlet. The inert gas-absorbent contactor can be vertical or horizontal and can include various conventional means for bringing about intimate contact of the stream of inert gases flowing therethrough with a stream of liquid absorbent injected thereinto. For example, conventional vapor-liquid contact trays can be used or packing materials such as Berl saddles employed. Preferably, however, the contactor 16 is a horizontal vessel having a series of banks of spray nozzles disposed along the internal length thereof so that liquid absorbent injected into the contactor by way of the liquid absorbent stream inlet is caused to be divided into a plurality of streams which are sprayed through the spray nozzles into contact with the inert gases as they flow through the contactor. As will be understood, liquid absorbent is utilized which has an affinity for water vapor so that upon contact with the stream of inert gases flowing through the contactor 16, water vapor is absorbed therefrom and the inert gases are dehydrated Aqueous glycol solutions are preferred for use as the liquid absorbent in accordance with the present invention, with an aqueous triethylene glycol solution being the most preferred liquid absorbent.

The resultant stream of dehydrated inert gases is withdrawn from the contactor 16 by way of the inert gas stream outlet thereof and a conduit 20 attached thereto. As will be understood, the conduit 20 leads the dehydrated stream of inert gases to a point of use, such as to one or more storage tanks to be purged.

Water-rich liquid absorbent is withdrawn from the contactor 16 by way of conduit 22 connected to the liquid absorbent outlet thereof and to the suction connection of a conventional liquid absorbent pump 24. The discharge connection of the pump 24 is connected to the liquid absorbent inlet of the heat exchanger 14 by a conduit 26.

As mentioned above, the water-rich liquid absorbent flows through the heat exchange coil disposed within the heat exchanger 14 thereby indirectly exchanging heat with the stream of hot inert combustion gases generated by the burner 12 so that the combustion gases are cooled and the stream of liquid absorbent heated. Conventional temperature and flow control apparatus are utilized for controlling the temperature of the stream of liquid absorbent exiting the heat exchanger 14. When the liquid absorbent is an aqueous glycol solution, the exit temperature of the liquid absorbent is controlled in the range of from about 325°F to about 400°F.

An absorbent reconcentrator 30 is provided, which like the contactor 10 can take a variety of conventional forms. Preferably, the vessel 30 is in the form of a vertical still column and includes trays or packing material for bringing about intimate contact between hot liquid absorbent flowing downwardly therein and vapors flowing upwardly therein.

The still column 30 includes a liquid absorbent stream inlet, a liquid absorbent stream outlet and a water vapor outlet. The water-rich liquid absorbent stream heated within the heat exchanger 14 is withdrawn therefrom by way of a conduit 28 connected between the liquid absorbent stream outlet of the heat exchanger 14 and the liquid absorbent stream inlet of the still column 30. A conduit 32 is provided connected to the water vapor outlet of the still column 30 which can be open to the atmosphere so that water vapors flowing therethrough are vented to the atmosphere. A conduit 34 connects the liquid absorbent stream outlet of the still column 30 with the suction connection of a conventional liquid absorbent pump 36. The discharge connection of the pump 36 is connected by a conduit 38 to the liquid absorbent stream inlet of the contactor 16. A cooler 40 is disposed in the conduit 38 for cooling the stream of liquid absorbent flowing to the contactor 16. The cooler 40 can be a conventional atmospheric air or cooling water heat exchanger.

OPERATION OF THE SYSTEM 10

In operation of the system 10, a substantially stoichiometric mixture of fuel and combustion air is combusted within the burner 12 so that a stream of hot inert combustion gases is produced under super-atmospheric pressure. That is, the combustion air blower generates a stream of combustion air under super-atmospheric pressure which is injected into the burner 12, mixed with fuel also under super-atmospheric pressure and combusted. The stream of hot inert gases containing water vapor produced by the burner 12 flow through the heat exchanger 14 wherein heat is removed from the gases and the gases are cooled. The resultant stream of cooled inert gases flow by way of the conduit 18 into the inert gas-liquid absorbent contactor 16. While passing through the contactor 16, the stream of inert gases is intimately contacted with a stream of liquid absorbent so that water vapor contained in the gases is absorbed and the gases are dehydrated. While a variety of liquid absorbents having an affinity for water vapor can be utilized in accordance with the present invention, as stated above aqueous glycol solutions are preferred.

The water-rich liquid absorbent produced in the contactor 16 is withdrawn therefrom by way of the conduits 22 and 26 and the pump 24. As will be understood by those skilled in the art, the pump 2 can be operated by means of a level controller disposed in the contactor 16 so that a constant level of liquid absorbent is maintained in the contactor 16. The water-rich liquid absorbent flows from the conduit 26 through the heat exchanger 14 wherein it is heated to a temperature such that water vapor contained in the liquid absorbent is vaporized. The hot stream of liquid absorbent flows by way of the conduit 28 into the still column 30 wherein water vapor released by the stream of liquid absorbent is removed therefrom. That is, the hot stream of liquid absorbent flows downwardly within the still column 30 into intimate contact with water and small amounts of absorbent vapors flowing upwardly therein so that the absorbent vapor is condensed and water vapor is separated from the liquid absorbent. The separated water vapor is removed from the still column 30 by way of the conduit 32 connected thereto. The resultant reconcentrated liquid absorbent is withdrawn from the still column 30 by way of the conduits 34 and 38 and the pump 36. The pump 36 is controlled in a conventional manner so that a desired rate of reconcentrated liquid absorbent flows by way of the conduit 38 into the contactor 16. The reconcentrated liquid absorbent is cooled by the cooler 40 prior to being injected into the contactor 16 thereby increasing the water vapor capacity of the liquid absorbent.

Figure 2:
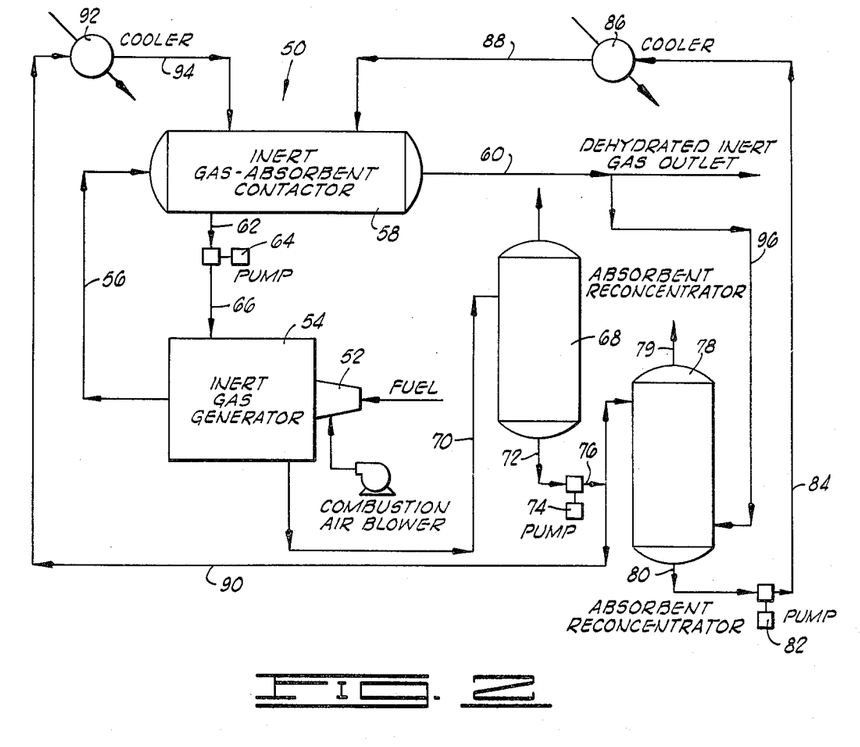
FIG. 2 is a diagrammatic illustration of an alternate system of apparatus of the invention.

Referring now to FIG. 2, an alternate system for carrying out the method of the present invention is illustrated and generally designated by the numeral 50. The system 50 is similar to the system 10 described above and includes a burner 52 wherein a fuel-air mixture is combusted to produce a stream of hot inert gases, and includes a heat exchanger 54 wherein the hot inert gases exchange heat with a stream of liquid absorbent flowing therethrough. Heat exchanger 54 is connected by a conduit 56 to an inert gas-liquid absorbent contactor vessel 58. The contactor 58 is similar to the contactor 16 above with the exception that it includes provision for two stage liquid absorbent contact. That is, separate liquid absorbent inlets are provided in the contactor 58 and spray nozzles or other apparatus for bringing about intimate contact between two separate streams of liquid absorbent in successive contact stages are provided. The stream of inert gases flowing through the contactor 58 is first intimately contacted with a first stream of liquid absorbent and then intimately contacted with a second stream of liquid absorbent. The resultant dehydrated stream of inert gases is withdrawn from the contactor 58 by way of a conduit 60 connected to the inert gas stream outlet thereof.

The water-rich liquid absorbent produced in the contactor 58 is withdrawn therefrom by way of a liquid absorbent outlet disposed therein and a conduit 62 connected thereto. The conduit 62 leads the stream of liquid absorbent from the contactor 58 to the suction connection of a conventional liquid absorbent pump 64. The discharge connection of the pump 64 is connected to the liquid absorbent stream inlet of the heat exchanger 54 by a conduit 66.

An absorbent reconcentrator or still column 68 of the type described above in connection with the system 10 is provided having a liquid absorbent stream inlet, a liquid absorbent stream outlet and a water vapor outlet. A conduit 70 is connected between the liquid absorbent stream outlet of the heat exchanger 54 and the liquid absorbent stream inlet of the still column 68. A conduit 72 connects the liquid absorbent stream outlet of the still column 68 to a liquid absorbent pump 74.

A stripping gas-liquid absorbent contactor 78 is provided having a liquid absorbent stream inlet, a liquid absorbent stream outlet, a stripping gas inlet and a water vapor and stripping gas outlet. The liquid absorbent stream inlet of the stripping gas contactor 78 is connected to the discharge of the pump 74 by a conduit 76. A conduit 80 connects the liquid absorbent outlet of the contactor 78 with the suction connection of a conventional liquid absorbent pump 82. The discharge connection of the pump 82 is connected by a conduit 84 to a liquid absorbent cooler 86. A conduit 88 connects the cooler 86 with the second stage liquid absorbent stream inlet of the contactor 58. A conduit 90 is provided connected to the conduit 76 downstream of the pump 74 and to a second liquid absorbent cooler 92. A conduit 94 connects the cooler 92 with the first stage liquid absorbent stream inlet of the contactor 58. A conduit 96 connects the conduit 60 to the stripping gas inlet of the stripping gas contactor 78.

OPERATION OF THE SYSTEM 50

In operation of the system 50, the stream of inert gases produced by the burner 52 and cooled while flowing through the heat exchanger 54 flows by ways of the conduit 56 into the contactor 58. While flowing through the contactor 58, the stream of inert gases is intimately contacted with liquid absorbent flowing therethrough whereby the inert gases are dehydrated. The resultant dehydrated stream of inert gases is withdrawn from the contactor 58 by way of the conduit 60 connected thereto from where the inert gases are conducted to a point of use.

The stream of water-rich liquid absorbent produced in the contactor 58 is withdrawn therefrom by way of the conduits 62 and 66 and the pump 64. The conduit 66 leads the water-rich liquid absorbent to the heat exchanger 54 wherein the liquid absorbent is heated to a temperature such that water vapor absorbed in the liquid absorbent is vaporized. From the heat exchanger 54, the heated water-rich liquid absorbent flows by way of the conduit 70 into the still column 68. While flowing through the still column 68 water vapor is separated from the liquid absorbent thereby reconcentrating the liquid absorbent. Reconcentrated liquid absorbent is withdrawn from the still column 68 by way of the conduits 72 and pump 74. From the pump 74 the reconcentrated liquid absorbent flows through the conduit 76. A major portion or stream of the reconcentrated liquid absorbent is caused, by the used of conventional flow controls and flow control valves, to flow through the conduit 90, through the cooler 92 wherein the liquid absorbent stream is cooled, and through the conduit 94 into the first contact stage within the inert gas-liquid absorbent contactor 58. A minor portion or stream of the reconcentrated liquid absorbent flows by way of the conduit 76 into the stripping gas-liquid absorbent contactor 78. As the reconcentrated liquid absorbent flows downwardly within the contactor 78 it is contacted by upwardly flowing dehydrated stripping gas which strips additional water vapor from the liquid absorbent thereby further reconcentrating it. The resultant further reconcentrated liquid absorbent is withdrawn from the contactor 78 by way of the conduit 80 and pump 82. From the pump 82, the further reconcentrated stream of liquid absorbent flows by way of the conduit 84, the cooler 86 wherein the liquid absorbent stream is cooled, and the conduit 88 into the second contact stage within the contactor 58. Thus, the stream of inert gases containing water vapor is first contacted by a stream of liquid absorbent of moderate concentration within the contactor 58 whereby a major portion of the water vapor is removed therefrom and then contacted by a stream of liquid absorbent of higher concentration whereby additional water vapor is removed from the stream of inert gases and the inert gases are dehydrated to a desired dew point. The stripping gas utilized in the contactor 78 for further reconcentrating the liquid absorbent is conveniently a portion of the dehydrated inert gas stream which is caused to flow through the conduit 96 into the contactor 78 by conventional flow controls and control valves. Stripped water vapor and stripping gas are removed from the contactor 78 by way of a conduit 79 connected to the water vapor and stripping gas outlet thereof. The water vapor and stripping gas can be vented to the atmosphere by the conduit 79.

Figure 3:
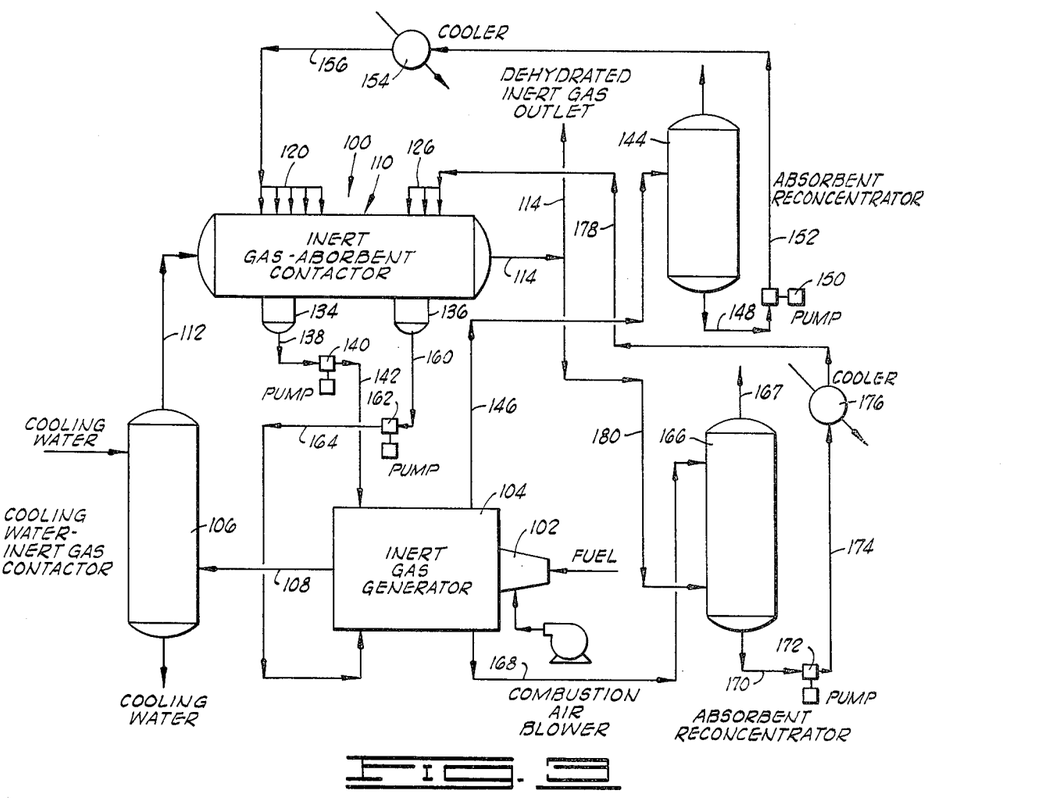
FIG. 3 is a diagrammatic illustration of yet another alternate system of apparatus of the invention.

Referring now to FIG. 3, yet another alternate system for carrying out the method of the present invention is illustrated and generally designated by the numeral 100. The system 100 is similar to the systems 10 and 50 described above and includes a burner 102 for generating a stream of hot inert gases connected to a heat exchanger 104 for exchanging heat between the inert gases and liquid absorbent. The heat exchanger 104 differs from those described above in that it includes two liquid absorbent heating coils disposed therein having separate inlet and outlets so that two separate streams of liquid absorbent are heated in the heat exchanger 104 by indirect heat exchange with the stream of hot inert gases flowing therethrough.

A cooling water-inert gas contactor 106 is provided having an inert gas stream inlet, an inert gas stream outlet, cooling water inlet and a cooling water outlet. A conduit 108 connects between the inert gas stream outlet connection of the heat exchanger 104 and the inert gas stream inlet connection of the contactor 106.

A two-stage gas-absorbent contactor 110 is provided for bringing about intimate contact between the stream of inert gases in two separate successive contact stages. The contactor 110 includes inert gas stream inlet and outlet connections, a first stage liquid absorbent stream inlet, a second stage liquid absorbent stream inlet, a first stage liquid absorbent stream outlet, and a second stage liquid absorbent stream outlet. A conduit 112 connects the inert gas stream outlet connection of the cooling water contactor 106 to the inert gas inlet connection of the contactor 110 and a conduit 114 is connected to the inert gas outlet connection of the contactor 110.

Figure 4:
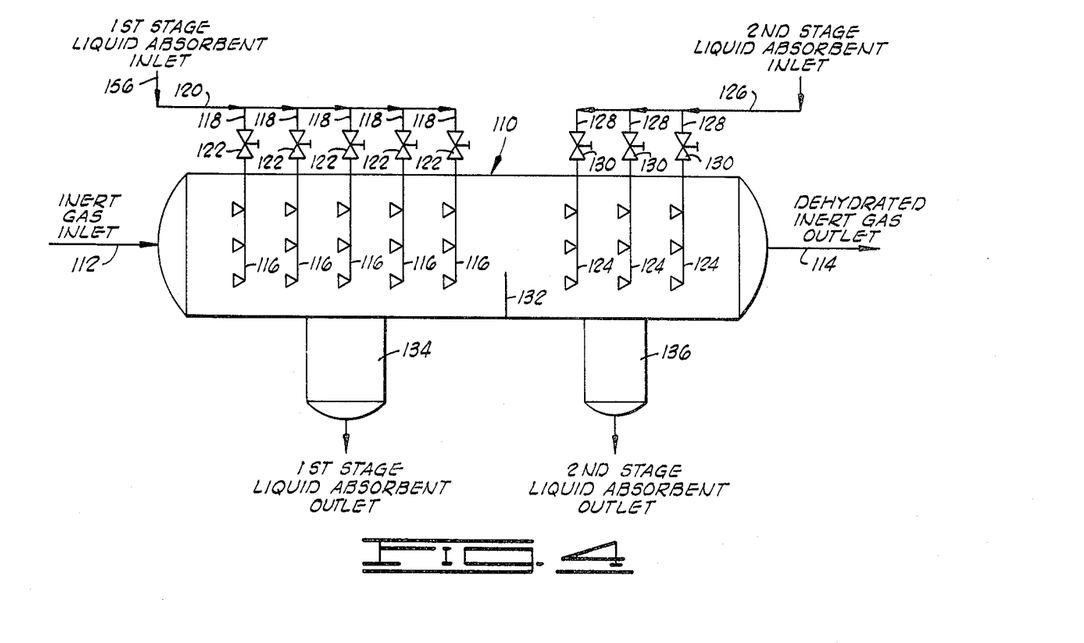
FIG. 4 is a partly diagrammatic side view of the inert gas-absorbent contactor shown in FIG. 3.

Referring now to FIG. 4, the contactor 110 is illustrated in greater detail. While, as mentioned above, the contactor 110 can take a variety of forms, it is preferably comprised of a horizontal vessel including provision for contacting the streams of inert gases in two separate stages. The first contact stage is comprised of a plurality of banks of spray nozzles 116. Each of the banks 116 is connected by a separate conduit 118 to a liquid absorbent distribution header 120. A flow control valve 122 is disposed in each of the conduits 118 for controlling the distribution of liquid absorbent to the various spray nozzle banks 116.

The second contact stage is comprised of a plurality of spray nozzle banks 124 each of which is connected to a distribution header 126 by a conduit 128. A flow control valve 130 is disposed in each of the conduits 128. A weir 132 is provided disposed in the bottom portion of the vessel 110 so that water-rich liquid absorbent produced in each of the contact stages is maintained separated. A first stage liquid absorbent accumulator sump 134 is provided connected to the vessel 110 forwardly of the weir 132, and a second stage liquid accumulator sump 136 is connected to the vessel 110 rearwardly of the weir 132.

Referring now to both FIGS. 3 and 4, liquid absorbent accumulating in the first stage sump 134 of the contactor 110 is withdrawn therefrom by way of a liquid absorbent stream outlet provided in the bottom of the sump 134 and a conduit 138 connected thereto. The conduit 138 is connected to the suction of a conventional liquid absorbent pump 140. A conduit 142 connects the discharge of the pump 140 with the liquid absorbent stream inlet of one of the heat exchange coils disposed within the heat exchanger 104.

An absorbent reconcentrator or still column 144 similar to the still columns 30 and 68 described above is provided. The still column 144 includes a liquid absorbent inlet, a water vapor outlet, and a liquid absorbent outlet. A conduit 146 connects the liquid absorbent inlet of the still column 144 with the liquid absorbent outlet of the heat exchange coil of the heat exchanger 104 connected to the conduit 142. A conduit 148 connects the liquid absorbent outlet of the still column 144 with the suction of a conventional liquid absorbent pump 150. The discharge of the pump 150 is connected by a conduit 152 to a liquid absorbent cooler 154 which is in turn connected to the distribution header 120 of the contactor 110 by a conduit 156.

Liquid absorbent accumulating in the second stage sump 136 of the contactor 110 is withdrawn therefrom by way of a liquid absorbent stream outlet disposed in the bottom portion thereof and a conduit 160 connected thereto. The conduit 160 is connected to the suction of a conventional liquid absorbent pump 162. The discharge of the pump 162 is connected to the liquid absorbent stream inlet of the second heat exchange coil disposed within the heat exchanger 104 by a conduit 164.

A stripping gas-liquid absorbent contactor 166 is provided similar to the contactor 78 described above. The stripping gas contactor 166 includes a liquid absorbent stream inlet, a liquid absorbent stream outlet, a stripping gas inlet and a stripping gas and water vapor outlet. A conduit 168 connects the liquid absorbent inlet of the stripping gas column 166 to the second heat exchange coil disposed in the heat exchanger 104 to which the conduit 164 is connected. The liquid absorbent stream outlet of the contactor 166 is connected by a conduit 170 to the suction of a conventional liquid absorbent pump 172. The discharge of the pump 172 is connected by a conduit 174 to a liquid absorbent cooler 176 which is in turn connected to the distribution header 126 of the contactor 110 by a conduit 178. A conduit 180 is connected to the conduit 114 and to the stripping gas inlet of the stripping gas contactor 166. A conduit 167 is connected to the water vapor and stripping gas outlet of the contactor 166.

OPERATION OF THE SYSTEM 100

In operation of the system 100, a steam of hot inert gases at super-atmospheric pressure is generated by the burner 102 and discharged into the heat exchanger 104. While flowing through the heat exchanger 104, the stream of hot inert gases gives up heat to the streams of water-rich liquid absorbent flowing through the two heat exchange coils disposed therein. The partially cooled stream of inert gases flows by way of the conduit 108 into the cooling water contactor 106 wherein the gases are further cooled. That is, the stream of inert gases flows upwardly through the contactor 106 into intimate contact with a stream of cooling water flowing downwardly therein whereby the stream of inert gases is cooled to a desired temperature. Since the stream of inert gases already contains water vapor, contacting the gases with cooling water does not add to the water vapor content of the gases and effectively cools the gases. However, as will be understood by those skilled in the art, many various other cooling apparatus can be employed in the system 100 for cooling the stream of inert gases to a desired temperature.

The cooled stream of inert gases is withdrawn from the contactor 106 and flows by way of the conduit 112 into the inert gas-liquid absorbent contactor 110. Referring specifically to FIG. 4, as the inert gas stream flows through the contactor 110, it is intimately contacted in a first stage by a first stream of liquid absorbent of moderate concentration. That is, as will be described further hereinbelow, a stream of liquid absorbent of moderate concentration is caused to flow through the header 120 into the conduits 118 and into the plurality of banks of spray nozzles 116. The liquid absorbent is sprayed from the spray nozzles within the interior of the contactor 110 thereby intimately contacting the stream of inert gas flowing therethrough causing water vapor contained in the inert gases to be absorbed by the liquid absorbent and the inert gas stream to be partially dehydrated. The resultant water-rich liquid absorbent accumulates in the first stage accumulator sump 134 from where it is withdrawn. From the first contact stage the partially dehydrated stream of inert gases flows into the second contact stage within the contactor 110 wherein it is intimately contacted by a stream of liquid absorbent of high concentration. That is, as will be further described hereinbelow, a stream of liquid absorbent of high concentration is caused to flow through the header 126, the conduits 128 and into the spray nozzle banks 124. The spray nozzles release the liquid absorbent into the contactor 110 whereby the partially dehydrated inert gas stream flowing therethrough is intimately contacted thereby causing additional water vapor to be removed therefrom. The resulting dehydrated stream of inert gases is withdrawn from the contactor 110 by way of the conduit 114 attached thereto. Water-rich liquid absorbent produced in the second stage accumulates in the second stage accumulator sump 136 from where it is withdrawn. A minor portion of the dehydrated inert gas stream is caused, through the use of conventional flow controls and flow control valves, to flow by way of the conduit 180 connected to the conduit 114 into the stripping gas-liquid absorbent contactor 166. The major portion of dehydrated inert gases is led by the conduit 114 to a point of use.

The water-rich liquid absorbent stream produced in the first contact stage within the contactor 110 is withdrawn from the first stage accumulator sump 134 by way of the conduit 138 and is pumped by the pump 140 through the conduit 142, and through one of the heat exchange coils disposed within the heat exchanger 104. While flowing through heat exchanger 104, the liquid absorbent stream is heated and the resultant heated stream is conducted by the conduit 146 into the still column 144. As the heated water-rich liquid absorbent stream flows downwardly within the still column 144 it is contacted by hot upwardly rising absorbent and water vapors, released from the absorbent, the absorbent vapors are recondensed and the water vapor separated and removed resulting in the production of a stream of liquid absorbent of moderate concentration which is removed from the still column 144 by way of the conduit 148. The water vapors produced in the still column 144 are removed therefrom by way of the water vapor outlet thereof and are vented to the atmosphere by way of the conduit 167 connected thereto. The stream of liquid absorbent of moderate concentration is pumped by the pump 150 through the conduit 152, through the cooler 154 wherein it is cooled, and into the first contact stage within the contactor 110 by way of the conduit 156, the header 120 and conduits 118 connected to the spray nozzle banks 116.

The water-rich liquid absorbent produced in the second contact stage within the contactor 110 is withdrawn from the second stage accumulator sump 136 by way of the conduit 160 and pumped by the pump 162 through the second heat exchange coil disposed within the heat exchanger 104. While flowing through the heat exchange coil the stream of liquid absorbent is heated and then flows by way of the conduit 168 into the stripping gas-liquid absorbent contactor 166. While flowing downwardly within the contactor 166, the hot liquid absorbent stream is intimately contacted by a stream of dehydrated inert gases flowing upwardly therein causing water vapor to be stripped from the liquid absorbent and a stream of liquid absorbent of high concentration to be produced. The high concentration stream of liquid absorbent is withdrawn from the stripping gas contactor by way of the conduit 170 and pumped by the pump 172 through the conduit 174, through the cooler 176 wherein the stream of liquid absorbent is cooled, through the conduit 178 and into the header 126 from where the liquid absorbent flows through the conduits 128 into the banks of spray nozzles 124.

Thus, the method of the present invention as carried out in the system 100 brings about the dehydration of the stream of inert gases in two stages within the contactor 110. This is advantageous in applications where a high rate of dehydrated inert gases at a low water dew point is required. Further, the use of two independent contact stages and two independent streams of liquid absorbent for dehydrating the inert gases is advantageous in that if unintentional equipment shut-down or failures occur in one liquid absorbent system or cycle, the other liquid absorbent cycle will remain operative thereby insuring that the inert gas stream flowing through the contactor 110 is at least partially dehydrated.

As will be understood by those skilled in the art, conventional flow and temperature controls are incorporated with the systems 10, 50, and 100 whereby the flow rates of the various streams of inert gas and liquid absorbent are controlled as required to produce a stream of dehydrated inert gases having a desired flow rate and a desired degree of dehydration. Further, conventional temperature control instruments and techinques are utilized in the systems for controlling the degree of heating of the streams of liquid absorbent whereby the streams are reconcentrated to the required purity.

As will be further understood by those skilled in the art, the selection of a particular system for a particular application depends on a variety of factors such as the required rate and degree of dehydration of the stream of inert gases to be produced. For example, if only a small flow rate of dehydrated inert gases is required, and the dehydration requirements are not severe, the system 10 can be used to advantage. In applications where a relatively high rate of inert gases and/or the inert gases must be dehydrated to a relatively low dew point, the systems 50 and 100 are utilized to advantage. Cooling of the stream of inert gases prior to being contacted by liquid absorbent as described above in connection with the system 100 is advantageous in that the inert gases entering the contactor 110 contain less water and reduce the liquid absorbent flow rate and purity requirements for dehydrating the gases to a required dew point. The two-stage liquid absorbent contact of the stream of inert gases as disclosed in connection with the systems 50 and 100 provides accurate control of the inert gas stream water content as well as reducing the overall liquid absorbent heating and reconcentration requirements.

Thus, the present invention is well adapted to carry out the objects and attain the ends and advantages mentioned as well as those inherent therein. While numerous changes in the arrangement and construction of apparatus for carrying out the methods of the invention as well as the order of steps required for carrying out the methods will suggest themselves to those skilled in the art, such changes can be made without departing from the spirit of this invention as defined by the lawful scope of the appended claims.

What is claimed is:

1. A method of generating a stream of dehydrated inert gases comprising the steps of:
   a. combusting a fuel-air mixture to generate a stream of hot inert gases containing water vapor;
   b. removing heat from said stream of hot inert gases so that said gases are cooled;
   c. intimately contacting said cooled stream of inert gases with a stream of liquid absorbent having an affinity for water vapor thereby dehydrating said stream of inert gases; and
   d. utilizing heat removed from said stream of hot inert gases in step (b) to reconcentrate said stream of liquid absorbent.

2. The method of claim 1 wherein step (d) includes passing said stream of liquid absorbent in heat exchange relationship with said stream of hot inert gases generated in step (a) so that said stream of inert gases is cooled and said stream of liquid absorbent is heated thereby vaporizing absorbed water contained therein.

3. The method of claim 2 wherein said liquid absorbent is an aqueous glycol solution.

4. A method of generating a stream of dehydrated inert gases comprising the steps of:
   a. combusting a mixture of fuel and air thereby generating a stream of hot inert gases containing water vapor;
   b. passing a stream of liquid absorbent in heat exchange relationship with said stream of hot inert gases so that said gases are cooled and said stream of liquid absorbent is heated thereby vaporizing water contained therein and reconcentrating said liquid absorbent;
   c. flowing said stream of reconcentrated liquid absorbent into intimate contact with said stream of cooled inert gases so that water vapor contained therein is absorbed by said stream of liquid absorbent and said stream of inert gases is dehydrated; and
   d. recycling the stream of water-rich liquid absorbent produced in step (c) into heat exchange relationship with said stream of hot inert gases in accordance with step (b).

5. The method of claim 4 which is further characterized to include the step of intimately contacting said stream of reconcentrated liquid absorbent produced in step (b) with a stream of dehydrated stripping gas so that additional water vapor is stripped therefrom thereby further reconcentrating said stream of liquid absorbent prior to flowing said stream of liquid absorbent into intimate contact with said stream of inert gases in accordance with step (c).

6. The method of claim 5 wherein said stream of dehydrated stripping gas utilized to strip additional water vapor from said stream of liquid absorbent is a portion of said stream of dehydrated inert gases produced in step (c).

7. The method of claim 6 which is further characterized to include the step of cooling said stream of reconcentrated liquid absorbent prior to flowing said stream of liquid absorbent into intimate contact wilth said stream of cooled inert gases in accordance with step (c).

8. The method of claim 7 wherein said liquid absorbent is an aqueous glycol solution.

9. The method of claim 8 wherein said glycol is triethylene glycol.

10. A method of generating a stream of dehydrated inert gases comprising the steps of:
    a. combusting a mixture of fuel and air thereby generating a stream of hot inert gases containing water vapor;
    b. passing a first stream of liquid absorbent in heat exchange relationship with said stream of hot inert gases so that said gases are cooled and said first stream of liquid absorbent is heated thereby vaporizing water contained therein and reconcentrating said first stream of liquid absorbent;
    c. flowing said reconcentrated first stream of liqiud absorbent into intimate contact with said stream of cooled inert gases so that water vapor contained therein is absorbed by said first stream of liquid absorbent and said inert gases are partially dehydrated;
    d. recycling the water-rich first stream of liquid absorbent produced in step (c) into heat exchange relationship with said stream of hot inert gases in accordance with step (b);
    e. passing a second stream of liquid absorbent in heat exchange relationship with said stream of hot inert gases generated in step (a) so that said gases are further cooled and said second stream of liquid absorbent is heated thereby vaporizing water contained therein and partially reconcentrating said second stream of liquid absorbent;
    f. contacting said partially reconcentrated second stream of liquid absorbent with a stream of dehydrated stripping gas to strip additional water vapor therefrom thereby futher reconcentrating said second stream of liquid absorbent;
    g. flowing said further reconcentrated second stream of liquid absorbent into intimate contact with said partially dehydrated stream of inert gases produced in step (c) so that additional water vapor is absorbed therefrom by said second stream of liquid absorbent and said inert gases are further dehydrated; and
    h. recycling the water-rich second stream of liquid absorbent produced in step (g) into heat exchange relationship with said stream of hot inert gases in accordance with step (f).

11. The method of claim 10 wherein said stream of dehydrated stripping gas utilized in accordance with step (b) is a portion of the stream of dehydrated inert gases produced in step (g).

12. The method of claim 11 which is further characterized to include the step of cooling said reconcentrated first stream of liquid absorbent prior to flowing said first stream of liquid absorbent into intimate contact with said stream of inert gases in accordance with step (c).

13. The method of claim 12 which is further characterized to include the step of cooling said reconcentrated second stream of liquid absorbent prior to flowing said second stream of liquid absorbent into intimate contact with said stream of partially dehydrated inert gases in accordance with step (g).

14. The method of claim 13 wherein said liquid absorbent is an aqueous glycol solution.

15. The method of claim 44 wherein said glycol is triethylene glycol.

16. A system for generating a stream of dehydrated inert gases comprising:
 a. burner means for combusting fuel and air and generating a stream of hot inert gases, and burner means having an inert gas stream discharge connection;
 b. heat exchanger means connected to said discharge connection of said burner means for removing heat from said stream of hot inert gases by indirect heat exchange with a stream of liquid absorbent whereby said stream of liquid absorbent is heated, said heat exchanger means including an inert gas stream outlet, a liquid absorbent stream inlet and a liquid absorbent stream outlet;
 c. an inert gas-liquid absorbent contactor having an inert gas stream inlet an inert gas stream outlet, a liquid absorbent stream inlet, and a liquid absorbent stream outlet;
 d. first conduit means connected between said inert gas stream outlet of said heat exchanger means and said inert gas stream inlet of said inert gas-liquid absorbent contactor;
 e. second conduit means connected between said liquid absorbent stream outlet of said inert gas-liquid absorbent contactor and said liquid absorbent stream inlet of said heat exchanger means;
 f. pump means for pumping a stream of liquid absorbent disposed in said second conduit means;
 g. a still column for separating water vapor from a heated liquid absorbent stream having a liquid absorbent stream inlet, a liquid absorbent stream outlet and a water vapor outlet;
 h. third conduit means connected between said liquid absorbent stream outlet of said heat exchanger means and said liquid absorbent stream inlet of said still column;
 i. fourth conduit means connected between said liquid absorbent stream outlet of said still column and said liquid absorbent stream inlet of said inert gas-liquid absorbent contactor; and
 j. second pump means for pumping a stream of liquid absorbent disposed in said fourth conduit means.

17. The system of claim 16 which is further characterized to include means for cooling a stream of liquid absorbent disposed in said fourth conduit means.

18. The system of claim 17 which is further characterized to include:
 a stripping gas-liquid absorbent contactor having a stripping gas stream inlet, a water vapor and stripping gas stream outlet, a liquid absorbent stream inlet and a liquid absorbent stream outlet, said liquid absorbent stream inlet and outlet being connected in said fourth conduit means; and
 fifth conduit means connected to said stripping gas stream inlet of said stripping gas liquid absorbent contactor and to a source of dehydrated stripping gas.

19. A system for generating a stream of dehydrated inert gases comprising:
 a. burner means for combusting fuel and air and generating a stream of hot inert gases, said burner means including an inert gas stream discharge connection;
 b. heat exchanger means connected to said discharge connection of said burner means for removing heat from said stream of hot inert gases by indirect heat exchange with a stream of liquid absorbent whereby said stream of liquid absorbent is heated, said heat exchanger means including an inert gas stream outlet, a liquid absorbent stream inlet and a liquid absorbent stream outlet;
 c. a two-stage inert gas-liquid absorbent contactor having an inert gas stream inlet, an inert gas stream outlet, a first stage liquid absorbent stream inlet, a second stage liquid absorbent stream inlet and a liquid absorbent stream outlet;
 d. first conduit means connected between said inert gas stream outlet of said heat exchanger means and said inert gas stream inlet of said inert gas-liquid absorbent contactor;
 e. second conduit means connected between said liquid absorbent stream outlet of said inert gas-liquid absorbent contactor and said liquid absorbent stream inlet of said heat exchanger means;
 f. pump means for pumping a stream of liquid absorbent disposed in said second conduit means;
 g. a still column for separating water vapor from a heated liquid absorbent stream and reconcentrating the liquid absorbent stream having a liquid absorbent stream inlet, a reconcentrated liquid absorbent stream outlet and a water vapor outlet;
 h. third conduit means connected between said liquid absorbent stream outlet of said heat exchanger means and said liquid absorbent stream inlet of said still column;
 i. a stripping gas-liquid absorbent contactor having a stripping gas stream inlet, a water vapor and stripping gas stream outlet, a liquid absorbent stream inlet and a liquid absorbent stream outlet;
 j. fourth conduit means connected between said liquid absorbent stream outlet of said still column and said liquid absorbent stream inlet of said stripping gasliquid absorbent contactor;
 k. second pump means for pumping a stream of liquid absorbent disposed in said fourth conduit means;
 l. fifth conduit means connected between said liquid absorbent stream outlet of said stripping gas-liquid absorbent contactor and said second stage liquid absorbent stream inlet of said inert gas-liquid absorbent contactor;
 m. third pump means for pumping a stream of liquid absorbent disposed in said fifth conduit means;
 n. sixth conduit means connected between said fourth conduit means downstream of said second pump means disposed therein and said first stage liquid absorbent stream inlet of said inert gas-absorbent contactor; and
 o. conduit means connected to said stripping gas stream inlet of said stripping gas-liquid absorbent contactor and to a source of stripping gas.

20. The system of claim 19 which is further characterized to include means for cooling said streams of liquid absorbent disposed in said fifth conduit means and said sixth conduit means.

21. A system for generating a stream of dehydrated inert gases comprising:
 a. burner means for combusting fuel and air and generating a stream of hot inert gases, said burner means including an inert gas stream discharge connection;
 b. heat exchanger means connected to said burner means discharge connection for removing heat from said stream of hot inert gases by indirect heat exchange with first and second streams of liquid absorbent whereby said streams of liquid absorbent are heated, said heat exchanger means including an inert gas stream outlet, a first liquid absorbent stream inlet, a first liquid absorbent stream outlet, a second liquid absorbent stream inlet and a second liquid absorbent stream outlet;

c. a two-stage inert gas-liquid absorbent contactor having an inert gas stream inlet, an inert gas stream outlet, a first stage liquid absorbent stream inlet, a first stage liquid absorbent stream outlet, a second stage liquid absorbent stream inlet and a second stage liquid absorbent stream outlet;

d. first conduit means connected between said inert gas stream outlet of said heat exchanger means and said inert gas stream inlet of said inert gas-liquid absorbent contactor;

e. second conduit means connected between said first stage liquid absorbent stream outlet of said inert gas-liquid absorbent contactor and said first liquid absorbent stream inlet of said heat exchanger means;

f. first pump means for pumping a stream of liquid absorbent disposed in said second conduit means;

g. a still column for separating water vapor from a heated liquid absorbent stream thereby reconcentrating said liquid absorbent stream having a liquid absorbent stream inlet, a liquid absorbent stream outlet and a water vapor outlet;

h. third conduit means connected between said first liquid absorbent stream outlet of said heat exchanger means and said liquid absorbent stream inlet of said still column;

i. fourth conduit means connected between said liquid absorbent stream outlet of said still column and said first stage liquid absorbent stream inlet of said inert gas-liquid absorbent contactor;

j. second pump means for pumping a stream of liquid absorbent disposed in said fourth conduit means;

k. fifth conduit means connected between said second stage liquid absorbent stream outlet of said inert gas-liquid absorbent contactor and said second liquid absorbent stream inlet of said heat exchanger means;

l. third pump means for pumping a stream of liquid absorbent disposed in said fifth conduit means;

m. a stripping gas-liquid absorbent contactor having a liquid absorbent stream inlet, a liquid absorbent stream outlet and a water vapor and stripping gas outlet;

n. sixth conduit means connected between said second liquid absorbent stream outlet of said heat exchanger means and said liquid absorbent stream inlet of said stripping gas-liquid absorbent contactor;

o. seventh conduit means connected between said liquid absorbent stream outlet of said stripping gas-liquid absorbent contactor and said second stage liquid absorbent stream inlet of said inert gas-liquid absorbent contactor;

p. fourth pump means for pumping a stream of liquid absorbent diaposed in said seventh conduit means; and g. eighth conduit means connected to a source of dehydrated stripping gas and to said stripping gas inlet of said stripping gas-liquid absorbent contactor.

22. The system of claim 22 which is further characterized to include means for cooling said stream of inert gases disposed in said first conduit means.

23. The system of claim 22 which is further characterized to include means for cooling a stream of liquid absorbent disposed in said fourth conduit means.

24. The system of claim 23 which is further characterized to include means for cooling a stream of liquid absorbent disposed in said seventh conduit means.

* * * * *

UNITED STATES PATENT OFFICE
CERTIFICATE OF CORRECTION

Patent No. 3,960,519   Dated June 1, 1976

Inventor(s) Harold O. Ebeling and Robert E. McMinn

It is certified that error appears in the above-identified patent and that said Letters Patent are hereby corrected as shown below:

Column 4, line 44, change "2" to --24--.

Column 13, line 1, change "44" to --14--.

Column 14, line 37, change "gasliguid" to --gas-liquid--.

Column 16, line 29, change "22" to --21--.

Signed and Sealed this

Thirty-first Day of August 1976

[SEAL]

Attest:

RUTH C. MASON
Attesting Officer

C. MARSHALL DANN
Commissioner of Patents and Trademarks